United States Patent [19]

Byrne

[11] 4,220,862

[45] Sep. 2, 1980

[54] IONIZATION CHAMBER FOR A SMOKE DETECTOR HAVING AN IMPROVED ARRANGEMENT FOR CAPTURING AIRBORNE COMBUSTION PRODUCTS

[75] Inventor: Michael Byrne, Farronshone, Ireland

[73] Assignee: General Electric Company, New York, N.Y.

[21] Appl. No.: 869,380

[22] Filed: Jan. 13, 1978

[51] Int. Cl.[2] .................................................. G01T 1/18

[52] U.S. Cl. ...................................... 250/384; 250/385

[58] Field of Search ............... 250/381, 382, 384, 385; 340/579

[56] References Cited

U.S. PATENT DOCUMENTS 4,017,733 4/1977 Ishii et al. ............................ 250/381

*Primary Examiner*—Alfred E. Smith

*Assistant Examiner*—Janice A. Howell

*Attorney, Agent, or Firm*—George R. Powers

[57] ABSTRACT

An ionization chamber for a smoke detector is disclosed wherein entry of airborne combustion products to the chamber is enhanced by an improved aperture and inlet surface arrangement which is formed in an electrode housing member for the chamber.

10 Claims, 4 Drawing Figures

IONIZATION CHAMBER FOR A SMOKE DETECTOR HAVING AN IMPROVED ARRANGEMENT FOR CAPTURING AIRBORNE COMBUSTION PRODUCTS

BACKGROUND OF THE INVENTION

1. Field Of The Invention

This invention relates to ionization smoke detectors. The invention relates more particularly to an improved arrangement for capturing airborne products of combustion.

2. Description Of The Prior Art

Ionization type smoke detectors are known and have been used as combustion product detectors in home and in industrial applications for early warning of fire. The ionization detector includes, generally, an ionization chamber having first and second electrodes, a means for establishing an electric field between these electrodes, and means for causing ionization of gaseous particles such as air particles in the chamber. In one form of detector, ionization is produced by exposing air particles to a radioactive source located within the chamber. Charged particles comprising ions are produced by the radiation and an ion current flows between the electrodes.

The smoke detector for home and industrial use is adapted to sense the presence of airborne products of combustion. Combustion often occurs at a distance removed from the smoke detector and combustion products are conveyed by air currents to the vicinity of the smoke detector at which location they are carried into the ionization chamber. It is desirable that combustion be detected at an early stage so that sufficient time and opportunity are available to react to the combustion. This, of course, renders it desirable that the smoke detector be sufficiently sensitive for detecting relatively low concentrations of combustion products in the air. While the internal structure of the ionization chamber and its associated detection and amplifying means is largely determinative of the sensitivity of the smoke detector, the capability of the detector to capture airborne combustion products is also an important factor and contributes to the smoke sensitivity of the detector. Thus, while it is desirable that the ionization smoke detector include means for establishing an enclosed chamber space which is free from interference by outside influences, on the other hand, it is also desirable that access be provided to the chamber which will enable airborne combustion products to readily enter the chamber. In this regard, it has been found that air currents can act on the ionization chamber and disadvantageously interfere with its operation. As a result, a compromise is made wherein an inlet means to the chamber for combustion products has been relatively restricted in order to reduce the effect of air currents on the chamber.

In one form of ionization detector, the chamber enclosure is formed principally by a metal electrode body of generally cup shaped configuration having an elongated annular segment and a closure segment located at one end of the annular segment. The electrode body includes an inlet means which is formed in the closure segment for enabling the flow of airborne combustion products into the chamber. In order to reduce the effect of air currents on the chamber, the inlet means comprise relatively small apertures which are formed in and are spaced about the closure segment. The relatively small apertures inhibit to some extent the effect of air currents on the chamber. However, they also limit to some extent the entry of airborne combustion products into the chamber. In addition, there is provided at times a means for baffling the inlet means for inhibiting the effect of air currents on the chamber. Baffling operates to also restrict the access of combustion products to the chamber.

In my co-pending U.S. pat. application Ser. No. 869,304 entitled AN IONIZATION SMOKE DETECTOR HAVING IMPROVED STABILITY AND SENSITIVITY which was filed concurrently herewith, and which is assigned to the assignee of this invention there is described an improved ionization chamber having means for reducing the effect of air currents on the operation of the chamber. In a smoke detector which is stabilized with respect to air currents prior arrangements of chamber inlet means represent a significant restriction on smoke detection sensitivity. It is therefore desirable to provide an inlet means in an ionization chamber which enhances the capture of airborne products of combustion.

SUMMARY OF THE INVENTION

Accordingly, it is the object of the present invention to provide in a smoke detection ionization chamber an improved inlet means for enabling access of airborne products of combustion to an interior of the chamber.

Another object of the invention is to provide a means for enhancing the capture of airborne products of combustion.

A further object of the invention is to provide a relatively non-complex and relatively inexpensive means for enhancing capture of airborne products of combustion.

In accordance with the general features of this invention, there is provided in a smoke detector having an ionization chamber, a housing member for the chamber wherein the housing member includes a first surface which is exposed to air currents, the improvement for enhancing access of airborne combustion products to the chamber comprising an aperture means and an inlet surface means which extends from the first surface and outwardly from the chamber for conveying air current through the aperture means into the chamber. The aperture means comprises in one arrangement a plurality of apertures and the inlet surface means comprises an equal plurality of inlet surfaces associated with the apertures which are integrally formed with the first surface. The plurality of surfaces are positioned for conveying into the chamber through the associated apertures, air currents which act on the chamber housing from a plurality of different directions. In a preferred embodiment, the apertures and surfaces have an arcuate configuration and are aligned in a circular array.

In accordance with more particular features of the invention, an ionization chamber for a smoke detector includes a generally cup shaped electrode housing body having an elongated annular segment and an integrally formed closure segment which is positioned at one end of the annular segment. The closure segment has a surface which is exposed to air currents which act on the chamber housing from a plurality of different directions. An inlet means comprises a circular array of apertures and an equal plurality of inlet surfaces which extend from the closure surface and outwardly from the chamber. The plurality of apertures and inlet surfaces are arcuate shaped and are positioned for conveying into the chamber through associated apertures air currents which act on the chamber housing from a plurality of different directions.

BRIEF DESCRIPTION OF THE DRAWINGS

These and other objects and features of the invention will become apparent with reference to the following specification and to the drawings wherein.

DETAILED DESCRIPTION

Figure 1:
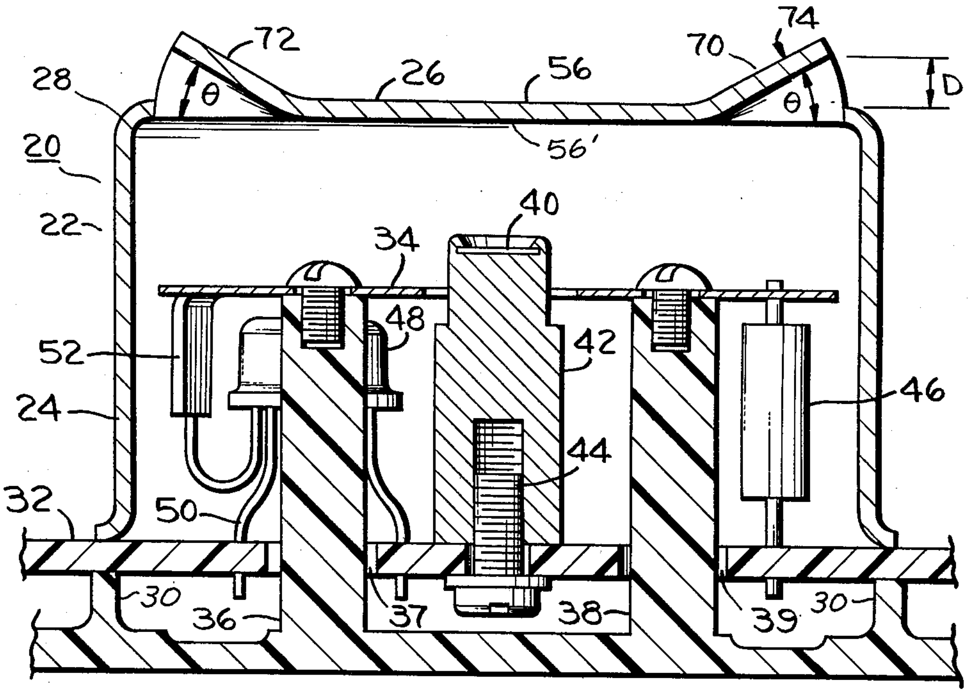
FIG. 1 is a side elevation view, in section, of an ionization chamber for a smoke detector constructed in accordance with features of this invention.

Referring now to the drawings and particularly to FIG. 1, an ionization chamber 20 of a smoke detector 21 (FIG. 4) is shown to include a first, generally cup shaped metal electrode housing body 22. The body 22 has an annular segment 24 and an integrally formed closure segment or wall portion 26 which is locted at an end 28 of the annular segment, the inner surface 56' of the wall portion 26 partially defining the outer extent of the chamber 20. A second closure means for the chamber is provided at an opposite end and comprises an ion chamber support base 30 and a segment 32 of printed circuit board which is spaced between the first electrode body 22 and the support base 30. The support base 30 is integrally formed with a housing member 33 (FIG. 4) of the smoke detector. This construction provides an enclosed ionization chamber in which an ion current can be established.

There is positioned within the ionization chamber 20 a second electrode comprising a disc shaped body 34 which is supported in the chamber. It is supported by bodies 36 and 38 extending through apertures 37 and 39 respectively in the circuit board segment 32. A means for causing ionization within the chamber comprises a source of radioactivity 40 which is supported in the chamber by a pillar shaped body 42. The body 42 is secured to the printed circuit board 32 by a screw 44. In addition, there is also located within the ionization chamber a relatively high impedence resistor 46 and detection and amplifying circuit means which are provided by an integrated circuit chip. The chip is enclosed in a housing 48. A plurality of leads extend from the housing 48 for connection to the printed circuit board 32 and to a conductive strap 52 of the electrode 34. An operating potential is applied between the first electrode body 22 and the second electrode body 34.

In operation, the radiation source 40 creates charged particles in the chamber and an ion current flows between the electrodes 22 and 34. In the absence of combustion products, a quiescent ion current flows in the chamber. When airborne combustion products enter the chamber, the ions attach themselves to the combustion products, the ion current amplitude decreases, the decrease is sensed by the detection and amplifying circuit means, and an alarm is sounded.

Figure 4:
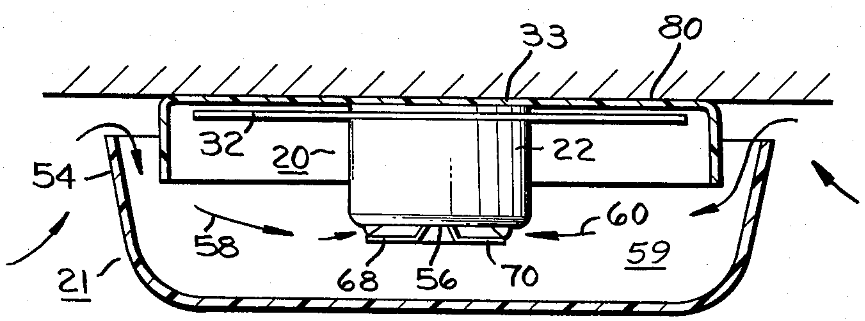
FIG. 4 is a side elevation view partly cut away, of a smoke detector constructed in accordance with features of the present invention.

The sensitivity of the smoke detector is dependent in part on the capability of the ionization chamber 20 to capture airborne combustion products existing in the vicinity of the chamber. As illustrated in FIG. 4, air currents reach the ionization chamber by flowing through the substantially unrestricted passageway 59 between the smoke detector housing member 33 and a second housing member 54 of the smoke detector. The sensitivity of the smoke detector is enhanced by the efficient capture of airborne products of combustion reaching the chamber 20. Efficient capture is particularly important at relatively low concentration levels of combustion products in air since detection at these lower levels provides for an early warning and enables rapid reaction to the combustion.

An improvement for enhancing the entry of airborne combustion products to the ionization chamber comprises an aperture means formed in a first outer surface 56 of the wall portion of the electrode housing body 22 and inlet surface means. The surface 56 comprises a surface of the closure segment 26. As illustrated in FIG. 4, it is a surface which is exposed to airflow from a plurality of different directions, as is exemplified by the arrows 58 and 60. The aperture means comprises a plurality of relatively narrow, elongated, arcuate shaped apertures 62, 64 and 66. An inlet surface means extends from the first surface 56 and outwardly from the chamber into the passageway 59 for conveying air currents through the aperture means into the chamber. The inlet surface means comprises a plurality of relatively narrow elongated inlet surfaces 68, 70 and 72 which are integrally formed from the surface 56 by stamping or other mechanical process. The inlet surfaces 68, 70 and 72 are associated with the aperture 62, 64 and 66 respectively. Each of the inlet surfaces and an associated aperture has a generally arcuate configuration. The plurality of inlet surfaces and associated apertures are alinged in a circular array. Each of the inlet surfaces 68, 70 and 72 provides for conveying air currents flowing near the surface 56 through an associated aperture 62, 64 and 66 respectively and to the interior of the ionization chamber. The inlet surfaces are positioned for intercepting or deflecting currents through associated apertures and into the chamber.

Figure 2:
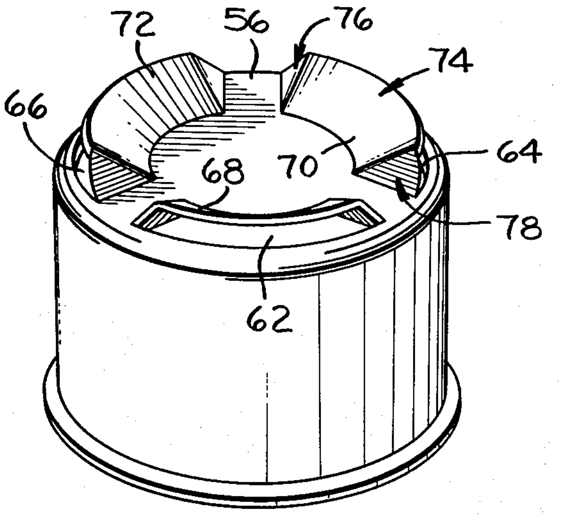
FIG. 2 is a perspective view of a housing body of ionization chamber of FIG. 1.
Figure 3:
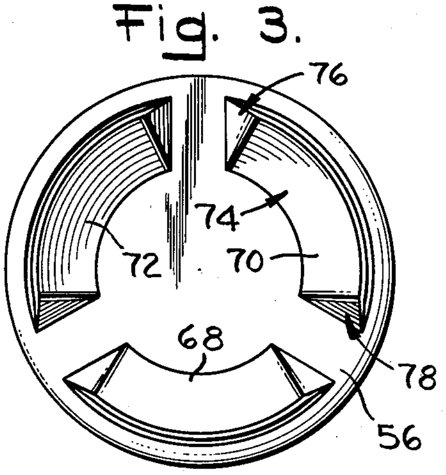
FIG. 3 is a plan view of the detector housing of FIG. 1.

Each of the inlet surfaces includes a generally arcuate extending segment such as is illustrated in FIG. 2 by the segment 74 of the inlet surface 70 and generally radially extending segments 76 and 78 located at opposite ends of the arcuate extending segment 74. These segments provide an inlet surface 70 having a generally scoop shaped configuration for deflecting air currents through the aperture 64 into the chamber.

As illustrated in FIG. 1, an arcuate extending segment, such as segment 74 of the inlet surface 70, extends from the surface 56 and forms an angle $\theta$ therewith. Efficiency of capture of combustion products and shielding of the ionization chamber from extraneous electrical fields is dependant on the magnitude of the angle $\theta$. The angle $\theta$ preferably has a range of between about 14° and about 30°. At values of $\theta$ less than about 14 degrees, the sensitivity of the ionization detector to combustion products exhibits a significant decrease. The electrode housing body 22 is formed of a metal such as aluminum and provides shielding of the chamber from extraneous interfering electrical fields. When the angle $\theta$ exceeds about 30°, the influence and interference of extraneous fields becomes undesirable, penetrating the apertures 62, 64 and 66. A preferred value of $\theta$ is in the range of about 22° to 25° and $\theta$ preferably has a value of about 23.5°.

In the smoke detector 21 of FIG. 4, the detector is supported from an upper surface 80 and the electrode housing body 22 depends from the housing member 33. As indicated, air currents enter the smoke detector between the housing member 33 and 54. The orientation of the aperture means and inlet means enables the capture of air currents flowing within the detector from a plurality of different directions. While in prior arrangements, airborne products of combustion entered the ionization chamber when carried to an aperture in the surface 56, the present arrangement captures airborne products in air streams at locations displaced from the surface 56. Air currents flowing as far as the distance D (FIG. 1) are captured by deflection into the chamber. The configuration of the aperture means and inlet means thus provides for relatively efficient capture of airborne combustion products. It has been found that the disclosed configuration substantially enhances the sensitivity of the smoke detector.

The inlet surface means and the inlet aperture means are integral with the electrode housing body 22 and are conveniently, simultaneously formed by stamping or other suitable mechanical process. However, other arrangements may be provided in accordance with the invention. For example, the aperture means can be formed independently and the inlet surface means need not be integral with the body 22 but can be secured thereto. Furthermore while the disclose embodiment of the aperture means and the inlet surface means is a circular array of arcuate configured segments, other forms of arrays and configurations are contemplated within the scope of this invention.

There has thus been described an improved arrangement for enhancing entry of airborne combustion products into an ionization chamber for a smoke detector. The enhanced entry is provided by an inlet aperture means and inlet surface means which extend from a surface of an electrode housing body of an ionization chamber.

While there have been described particular embodiments of the invention, it will be appreciated by those skilled in the art that variations may be made thereto without departing from the spirit of the invention and the scope of the appended claims.

What is claimed is:

1. In a smoke detector having an ionization chamber, improved means for enhancing entry of airborne combustion products to the ionization chamber, said improved means comprising:

housing means forming passage means for permitting the flow of air currents from a plurality of different directions through said smoke detector without substantial restriction of the air currents, said housing means including a housing member having a wall portion thereof having a first outer surface exposed to air currents flowing through said passage means and a second inner surface at least partially defining said ionization chamber, an aperture means formed in said wall portion, and an inlet surface means extending outwardly from said wall portion into said passage means for conveying air from said passage means through said aperture means into said ionization chamber.

2. The smoke detector of claim 1 wherein said housing member comprises a generally cup-shaped electrode body having an elongated annular segment and an integrally formed closure member located at one end of said annular segment, said closure member comprising said wall portion.

3. The smoke detector of claim 1 wherein said aperture means comprise a plurality of apertures, said inlet surface means comprises an equal plurality of inlet surfaces extending from said first surface and outwardly from said chamber and each of said inlet surfaces is associated with an aperture for conveying air currents through said apertures into said chamber.

4. The smoke detector of claim 3 wherein said plurality of inlet surfaces are integrally formed with said first surface.

5. The smoke detector of claim 3 wherein each of said inlet surfaces and associated apertures extend in an arcuate configuration.

6. The smoke detector of claim 5 wherein said plurality of surfaces and apertures are aligned in a circular array.

7. The smoke detector of claim 1 wherein said inlet surface means comprises an inlet surface, said inlet surface extending from said first surface forms an angle $\theta$ therewith, and said angle $\theta$ has a value in the range of about 14° to about 30°.

8. The smoke detector of claim 7 wherein said angle $\theta$ has a value in the range of about 22° to about 25°.

9. The smoke detector of claim 8 wherein said angle $\theta$ has a value of about 23.5°.

10. The smoke detector of claim 1 wherein said inlet surface means has a scoop shaped configuration for deflecting air currents through said aperture into said chamber.

* * * * *